(12) United States Patent
Chen

(10) Patent No.: US 7,756,353 B2
(45) Date of Patent: Jul. 13, 2010

(54) EDGE ENHANCEMENT METHOD FOR HALFTONE IMAGE

(75) Inventor: Pei-Chung Chen, Taipei (TW)

(73) Assignee: Primax Electronics Ltd., Neihu, Taipei (TW)

( * ) Notice: Subject to any disclaimer, the term of this patent is extended or adjusted under 35 U.S.C. 154(b) by 1242 days.

(21) Appl. No.: 11/304,641

(22) Filed: Dec. 16, 2005

(65) Prior Publication Data

US 2007/0139716 A1    Jun. 21, 2007

(51) Int. Cl.
H04N 1/409 (2006.01)
G06K 9/76 (2006.01)

(52) U.S. Cl. .............. 382/266; 358/3.06; 358/3.27; 382/199

(58) Field of Classification Search .......... 358/3.27, 358/3.06; 382/173, 199, 266
See application file for complete search history.

(56) References Cited

U.S. PATENT DOCUMENTS

| | | | |
|---|---|---|---|
| 4,586,089 A * | 4/1986 | Nakazato et al. ........ 358/461 |
| 5,029,108 A | 7/1991 | Lung | |
| 5,321,525 A * | 6/1994 | Hains ................ 358/3.01 |
| 5,565,907 A * | 10/1996 | Wada et al. ............ 347/251 |
| 5,757,976 A | 5/1998 | Shu | |
| 6,061,145 A | 5/2000 | Kanda et al. | |
| 6,201,613 B1 | 3/2001 | Zhang et al. | |
| 6,424,747 B1 | 7/2002 | Morikawa | |
| 2004/0136034 A1* | 7/2004 | Curry ................ 358/3.12 |
| 2006/0256124 A1* | 11/2006 | Kuo et al. ............ 345/589 |

\* cited by examiner

*Primary Examiner*—Bhavesh M Mehta
*Assistant Examiner*—Michael Vanchy, Jr.
(74) *Attorney, Agent, or Firm*—Winston Hsu

(57) ABSTRACT

A method for enhancing the edge of a halftone image includes steps of: forming an analysis window with a central pixel and neighboring pixels; quantifying the pixels to get a halftone table; assigning a designated value to each pixel for generating a halftone result; and comparing the halftone result with an edge enhancement table. The edge enhancement table includes a plurality of dotting commands and a plurality of dot tables. The dot tables correspond to the dotting commands so that when a dot table is conformed to the halftone result, a correspondent adjustment of halftone table is taken.

13 Claims, 25 Drawing Sheets
(17 of 25 Drawing Sheet(s) Filed in Color)

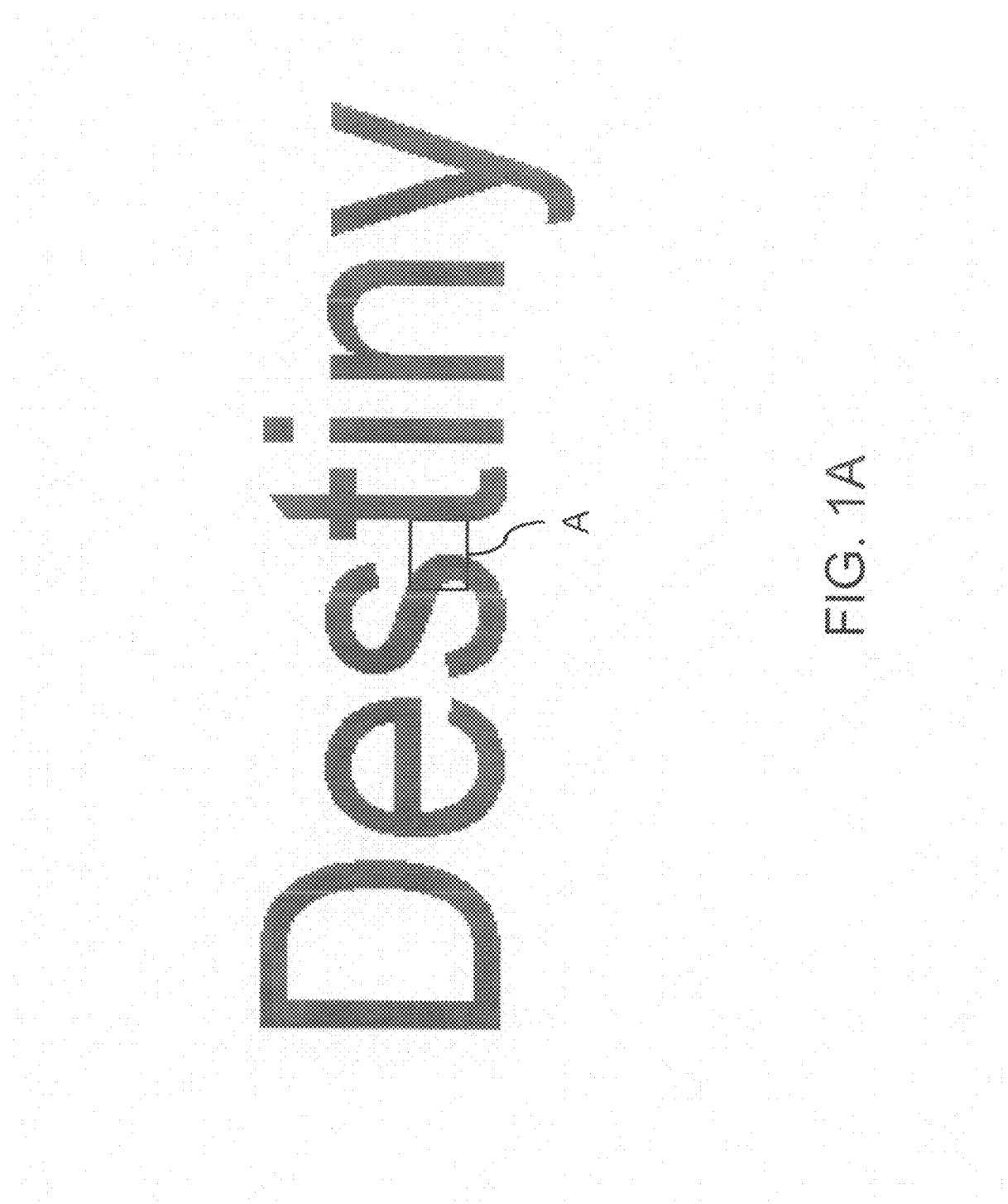

Cyan color plane

Magenta color plane

Yellow color plane

Black color plane

242

| h11 | h21 | h31 | h41 | h51 | h61 | h71 | h81 | h91 |
|-----|-----|-----|-----|-----|-----|-----|-----|-----|
| h12 | h22 | h32 | h42 | h52 | h62 | h72 | h82 | h92 |
| h13 | h23 | h33 | h43 | h53 | h63 | h73 | h83 | h93 |
| h14 | h24 | h34 | h44 | h54 | h64 | h74 | h84 | h94 |
| h15 | h25 | h35 | h45 | h55 | h65 | h75 | h85 | h95 |

| 1 | 1 | 1 | 1 | 1 | 0 | 0 | 0 | 0 |
|---|---|---|---|---|---|---|---|---|
| 1 | 1 | 1 | 1 | 1 | 1 | 0 | 0 | 0 |
| 1 | 1 | 1 | 1 | 1 | 1 | 0 | 0 | 0 |
| 1 | 1 | 1 | 1 | 1 | 1 | 1 | 0 | 0 |
| 1 | 1 | 1 | 1 | 1 | 1 | 1 | 0 | 0 |

| h11 | h21 | h31 | h41 | h51 | h61 | h71 | h81 | h91 |
|-----|-----|-----|-----|-----|-----|-----|-----|-----|
| h12 | h22 | h32 | h42 | h52 | h62 | h72 | h82 | h92 |
| h13 | h23 | h33 | h43 | h53 | h63 | h73 | h83 | h93 |
| h14 | h24 | h34 | h44 | h54 | h64 | h74 | h84 | h94 |
| h15 | h25 | h35 | h45 | h55 | h65 | h75 | h85 | h95 |

| 1 | 1 | 1 | 1 | 0 | 0 | 0 | 0 | 0 |
|---|---|---|---|---|---|---|---|---|
| 1 | 1 | 1 | 1 | 1 | 0 | 0 | 0 | 0 |
| 1 | 1 | 1 | 1 | 1 | 0 | 0 | 0 | 0 |
| 1 | 1 | 1 | 1 | 1 | 1 | 0 | 0 | 0 |
| 1 | 1 | 1 | 1 | 1 | 1 | 0 | 0 | 0 |

| h11 | h21 | h31 | h41 | h51 | h61 | h71 | h81 | h91 |
|-----|-----|-----|-----|-----|-----|-----|-----|-----|
| h12 | h22 | h32 | h42 | h52 | h62 | h72 | h82 | h92 |
| h13 | h23 | h33 | h43 | h53 | h63 | h73 | h83 | h93 |
| h14 | h24 | h34 | h44 | h54 | h64 | h74 | h84 | h94 |
| h15 | h25 | h35 | h45 | h55 | h65 | h75 | h85 | h95 |

| 1 | 1 | 1 | 0 | 0 | 0 | 0 | 0 | 0 |
|---|---|---|---|---|---|---|---|---|
| 1 | 1 | 1 | 1 | 0 | 0 | 0 | 0 | 0 |
| 1 | 1 | 1 | 1 | 0 | 0 | 0 | 0 | 0 |
| 1 | 1 | 1 | 1 | 1 | 0 | 0 | 0 | 0 |
| 1 | 1 | 1 | 1 | 1 | 0 | 0 | 0 | 0 |

FIG.12B

| x | x | x | x | x | x | x | x | x |
|---|---|---|---|---|---|---|---|---|
| x | x | x | x | x | x | x | x | x |
| x | x | x | x | x | a63 | a73 | a83 | a93 |
| a14 | a24 | a34 | a44 | a54 | a64 | a74 | a84 | a94 |
| a15 | a25 | a35 | a45 | a55 | a65 | a75 | a85 | a95 |

FIG.13A

| x | x | x | x | x | x | x | x | x |
|---|---|---|---|---|---|---|---|---|
| x | x | x | x | x | x | x | x | x |
| x | x | x | x | x | e63 | e73 | e83 | e93 |
| e14 | e24 | e34 | e44 | e54 | e64 | e74 | e84 | e94 |
| e15 | e25 | e35 | e45 | e55 | e65 | e75 | e85 | e95 |

| h11 | h21 | h31 | h41 | h51 | h61 | h71 | h81 | h91 |
|---|---|---|---|---|---|---|---|---|
| h12 | h22 | h32 | h42 | h52 | h62 | h72 | h82 | h92 |
| h13 | h23 | h33 | h43 | h53 | h63+a63 | h73+a73 | h83+a83 | h93+a93 |
| h14+a14 | h24+a24 | h34+a34 | h44+a44 | h54+a54 | h64+a64 | h74+a74 | h84+a84 | h94+a94 |
| h15+a15 | h25+a25 | h35+a35 | h45+a45 | h55+a55 | h65+a65 | h75+a75 | h85+a85 | h95+a95 |

FIG.13C

| x | x | x | x | x | x | x | x | x |
|---|---|---|---|---|---|---|---|---|
| x | x | x | x | x | x | x | x | x |
| x | x | x | x | x | 4 | 3 | 2 | 1 |
| 1 | 2 | 3 | 4 | 4 | 4 | 3 | 2 | 1 |
| 1 | 1 | 2 | 2 | 2 | 2 | 1 | 1 | 0 |

FIG.14A

|   |   |   |   |   |   |   |   |   |
|---|---|---|---|---|---|---|---|---|
| x | x | x | x | x | x | x | x | x |
| x | x | x | x | x | x | x | x | x |
| x | x | x | x | x | 14.8 | 11.1 | 7.4 | 3.7 |
| 3.7 | 7.4 | 11.1 | 14.8 | 14.8 | 14.8 | 11.1 | 7.4 | 3.7 |
| 3.7 | 3.7 | 7.4 | 7.4 | 7.4 | 7.4 | 3.7 | 3.7 | 0 |

| h11 | h21 | h31 | h41 | h51 | h61 | h71 | h81 | h91 |
|---|---|---|---|---|---|---|---|---|
| h12 | h22 | h32 | h42 | h52 | h62 | h72 | h82 | h92 |
| h13 | h23 | h33 | h43 | h53 | h63+14.8 | h73+11.1 | h83+7.4 | h93+3.7 |
| h14+3.7 | h24+7.4 | h34+11.1 | h44+14.8 | h54+14.8 | h64+14.8 | h74+11.1 | h84+7.4 | h94+3.7 |
| h15+3.7 | h25+3.7 | h35+7.4 | h45+7.4 | h55+7.4 | h65+7.4 | h75+3.7 | h85+3.7 | h95+0 |

| h11 | h21 | h31 | h41 | h51 | h61 | h71 | h81 | h91 |
|-----|-----|-----|-----|-----|-----|-----|-----|-----|
| h12 | h22 | h32 | h42 | h52 | h62 | h72 | h82 | h92 |
| h13 | h23 | h33 | h43 | h53 | h63 | h73 | h83 | h93 |
| h14 | h24 | h34 | h44 | h54 | h64 | h74 | h84 | h94 |
| h15 | h25 | h35 | h45 | h55 | h65 | h75 | h85 | h95 |

| 1 | 1 | 0 | 0 | 0 | 0 | 0 | 0 | 0 |
|---|---|---|---|---|---|---|---|---|
| 1 | 1 | 1 | 0 | 0 | 0 | 0 | 0 | 0 |
| 1 | 1 | 1 | 0 | 0 | 0 | 0 | 0 | 0 |
| 1 | 1 | 1 | 1 | 0 | 0 | 0 | 0 | 0 |
| 1 | 1 | 1 | 1 | 0 | 0 | 0 | 0 | 0 |

FIG.16B

EDGE ENHANCEMENT METHOD FOR HALFTONE IMAGE

BACKGROUND

1. Field of Invention

The invention generally relates to a method of enhancing edge quality when processing an image, and in particular relates to a method of edge enhancement for halftone image.

2. Related Art

For printers or scanners, there are specific sizes of printing or scanning. In a certain size area, more pixels make a higher image quality. The pixel resolution is measured by dots per inch (dpi). In monochromatic printing, pixels are non-black or white. In the dpi solution, a pixel may include several dots. Usually, when a pixel is to be printed, all the dots of the pixel are printed. Likewise, when a pixel is not to be printed, all the dots of the pixel are not printed.

However, if the resolution of the image output apparatus is relatively low, the edge of the image object is found to be step-shaped of one grid by another grid through the naked eye, and a smooth edge as that of the original image object cannot be obtained. Therefore, various solutions are proposed to reduce the jagged effect on the edge of the image object, such that the image output by the image output apparatus can match with the real subject.

As for Edge Enhancement Method and Apparatus for Dot Matrix Devices disclosed in U.S. Pat. No. 5,029,108, the dotting state of the pixels of an image edge and that of the surrounding pixels are compared with a plurality of predetermined pictures, to determine which predetermined picture the pixels of the image edge match with, thus it is determined how to dot the pixels at the image edge to smooth the output image edge and to allow the image more accurately match with the original one. The enhancement of central pixels of each predetermined picture will be modified differently according to the dotting state of the surrounded pixels, for example, dotting at ¼ to the left of the central pixel, dotting at ⅔ to the right of the central pixels, etc However, the method mentioned above is only suitable for single color image output (namely, the black and white image output). When executing the color image output of the image output device, since each of the color images are composed of the planes of four different colors (cyan, magenta, yellow, and black; CMYK), Thus, in executing the supplementary dotting of the pixels on the edge of the image, the planes of all the four colors must be taken into consideration. Presently it doesn't have any mechanism, which can be utilized to determine the planes, of which colors must be utilized to implement the supplementary dotting of the pixels on the edge of the image. However, if the planes of all the four colors are used to perform the supplementary dotting, then the color displayed on this pixel will be black, thus it may be different from that of the original subject. Nevertheless, there is just no way to know which color may be used to implement the supplementary dotting.

Further, many printing and display devices can only produce binary outputs, therefore, color images have to be transformed into binary outputs. The transforming is called "halftone". In halftone process, the error diffusion is a usual method to get higher quality binary outputs. Because halftone output is decreased of its quality during the color level degression, there are many different techniques trying to improve the problem.

In U.S. Pat. No. 6,424,747, a smoothing circuit smoothes lookup tables generated by a color conversion table generator, using a filter function selected from a filter function storage circuit, and supplies smoothed lookup tables to a color processing circuit. However, the method of direct changing the color value may influence the image color reality. In U.S. Pat. No. 6,201,613, an image enhancement of halftone images is performed by subjecting the halftone image to a low-pass filter so as to smooth out halftone variations between adjacent pixels. However, the smoothing is limited due to processing of already-processed halftone image only. U.S. Pat. No. 6,061,145 also discloses a halftone image processing method in which multi-gradation image data is quantized to be converted into quantized pixel patterns, a smoothing portion of a quantized image is detected and a contour of the quantized image is corrected by interpolating pixels of the detected smoothing portion. The quantized pixel pattern of the smoothing portion in the detected quantized image is replaced by a pixel pattern for smoothing stored in a memory. Since the detecting and replacing is a two-step process, it takes more time. Further, more preset patterns cost more detecting time and larger memory size, so it is not practicable. U.S. Pat. No. 5,757,976 provides a set of error filters having different sizes and associated weighted coefficients for diffusing quantization errors among neighboring pixels in predetermined tonal areas of an image to achieve a smooth halftone image quality. However, the error filters can only influence the noise and repeated patterns of halftone process. They don't have effective improvements to original images of lower quality.

Therefore, the conventional methods mostly aim at the overall image quality improvement, or just the monochromatic image edge improvement. As for color image output devices, how to take enhancements to the edge of an image, and to make the edge of output image smoother and conformed to the original color, actually remains an unresolved difficult problem.

SUMMARY

The object of the invention is to provide an edge enhancement method of halftone image and to solve the aforesaid problems of image edge improvements.

Therefore, a method for enhancing the edge of a halftone image according to the invention includes the following steps: forming an analysis window with a central pixel wherein the analysis window includes the central pixel and the neighboring pixels located around it; quantifying the pixels to get a halftone table; assigning a designated one-bit value to each pixel for generating a halftone result; comparing the halftone result with an edge enhancement table wherein the edge enhancement table includes a plurality of dotting commands and a plurality of dot tables and each dot table corresponds one of dotting commands; and executing a halftone adjustment for the halftone table when one of dot tables is conformed to the halftone result.

The adjustment of halftone table includes the following steps: obtaining correspondent dotting commands according to the conformed dot table; calculating a plurality of adjustment values for the pixels according to the dotting commands and an error diffusion process; and adjusting the halftone table according to the adjustment values.

The invention further provides a method for enhancing the edge of colored halftone image. The method includes the following steps: separating an edge image into four color planes; processing halftone error diffusion for each color plane, and comparing the dot table and correspondent dotting commands with a dotting command lookup table to obtain practical dotting commands for the pixels.

The halftone error diffusion process for each color plane includes the following steps: forming an analysis window taking a pixel as a center wherein the analysis window includes the central pixel and the neighboring pixels located around it; quantifying the pixels to get a halftone table; assigning a designated one-bit value to each pixel for generating a halftone result; comparing the halftone result with an edge enhancement table wherein the edge enhancement table includes a plurality of dotting commands and a plurality of dot tables and each dot table corresponds one of dotting commands; and executing an adjustment for the halftone table when one of dot tables is conformed to the halftone result.

The adjustment of halftone table includes the following steps: obtaining correspondent dotting commands according to the conformed dot table; calculating a plurality of adjustment values for the pixels according to the dotting commands and an error diffusion process; and adjusting the halftone table according to the adjustment values.

For colored halftone image, the aforesaid steps are repeated sequentially for each central pixel in each color plane so as to finish halftone error diffusions for all color planes.

An embodiment of the invention shows the method of enhancing image quality of an image output; that is, through suitable dotting on the image edge, the edge of the image can be smoother.

Meanwhile, the invention remains the image quality and lets the color of image much alike the original image.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The patent or application file contains at least one drawing executed in color. Copies of this patent or patent application publication with color drawing(s) will be provided by the office upon request and payment of the necessary fee.

The invention will become more fully understood from the detailed description given hereinbelow. However, this description is for purposes of illustration only, and thus is not limitative of the invention, wherein:

FIG. 1A is an image as an example;

FIGS. 8A and 8B are the halftone table and the halftone result generated by the analysis window of FIG. 7;

FIGS. 10A and 10B are the halftone table and the halftone result generated by the analysis window of FIG. 9;

FIGS. 12A and 12B are the halftone table and the halftone result generated by the analysis window of FIG. 11;

FIGS. 13A to 13C are pixel adjustment value, pixel error diffusion value and an adjusted halftone table generated by the analysis window of FIG. 11;

FIG. 14A is a descriptive view of error diffusion values of pixels in FIG. 13B;

FIG. 14B is a descriptive view of pixel adjustment values of pixels in FIG. 13A;

FIG. 14C is a descriptive view of adjusted halftone table of pixels in FIG. 13C;

FIGS. 16A and 16B are the halftone table and the halftone result generated by the analysis window of FIG. 15.

DETAILED DESCRIPTION

FIG. 1 is an example of an image, a word "Destiny", in which a partial edge of the character "s" is taken as an edge enhancement example in the following descriptions of preferred embodiment of the invention. The word is of blue color.

Figure 1B:
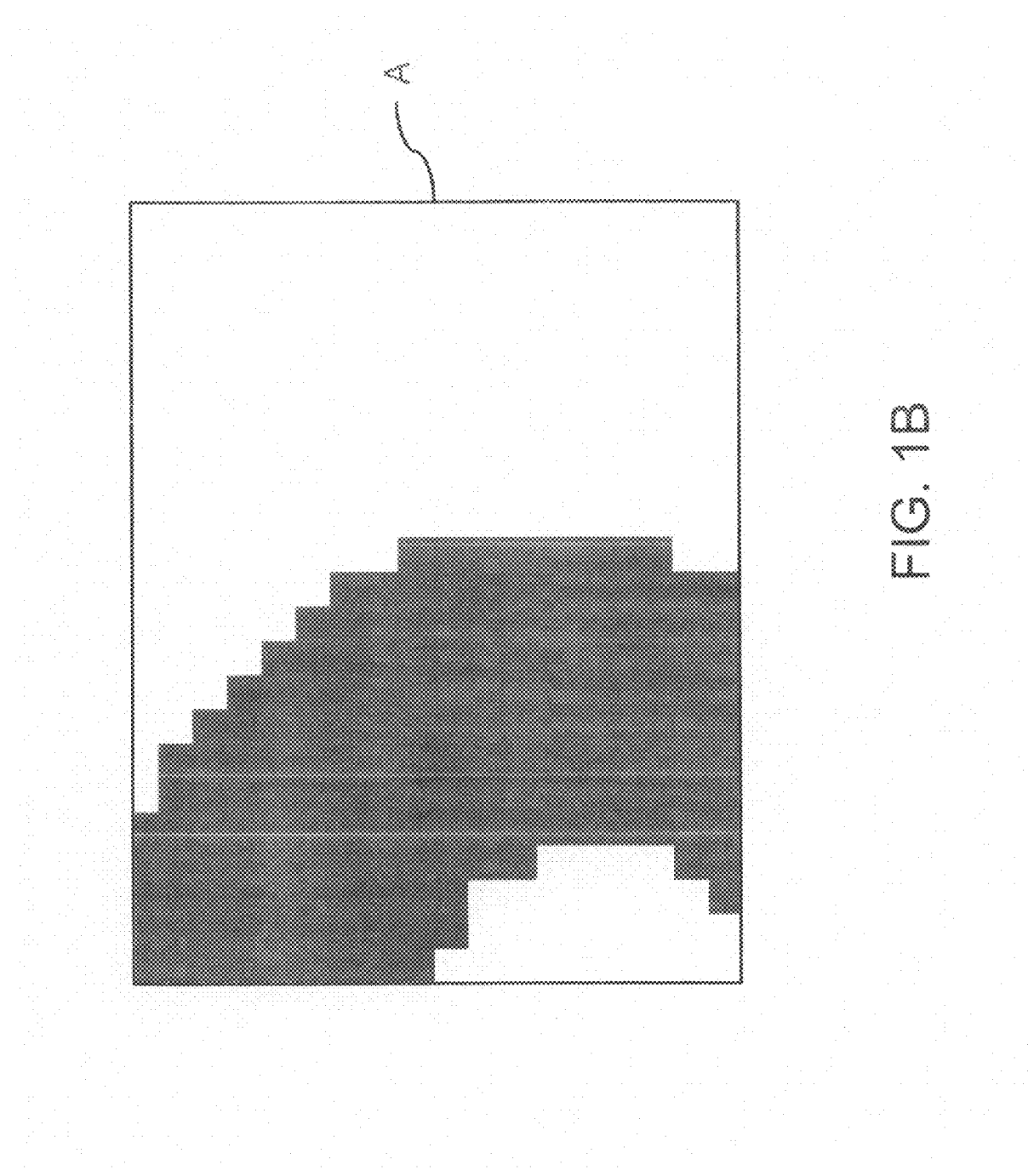
FIG. 1B an enlargement of partial edge taken from the image of FIG. 1A.
Figure 2:
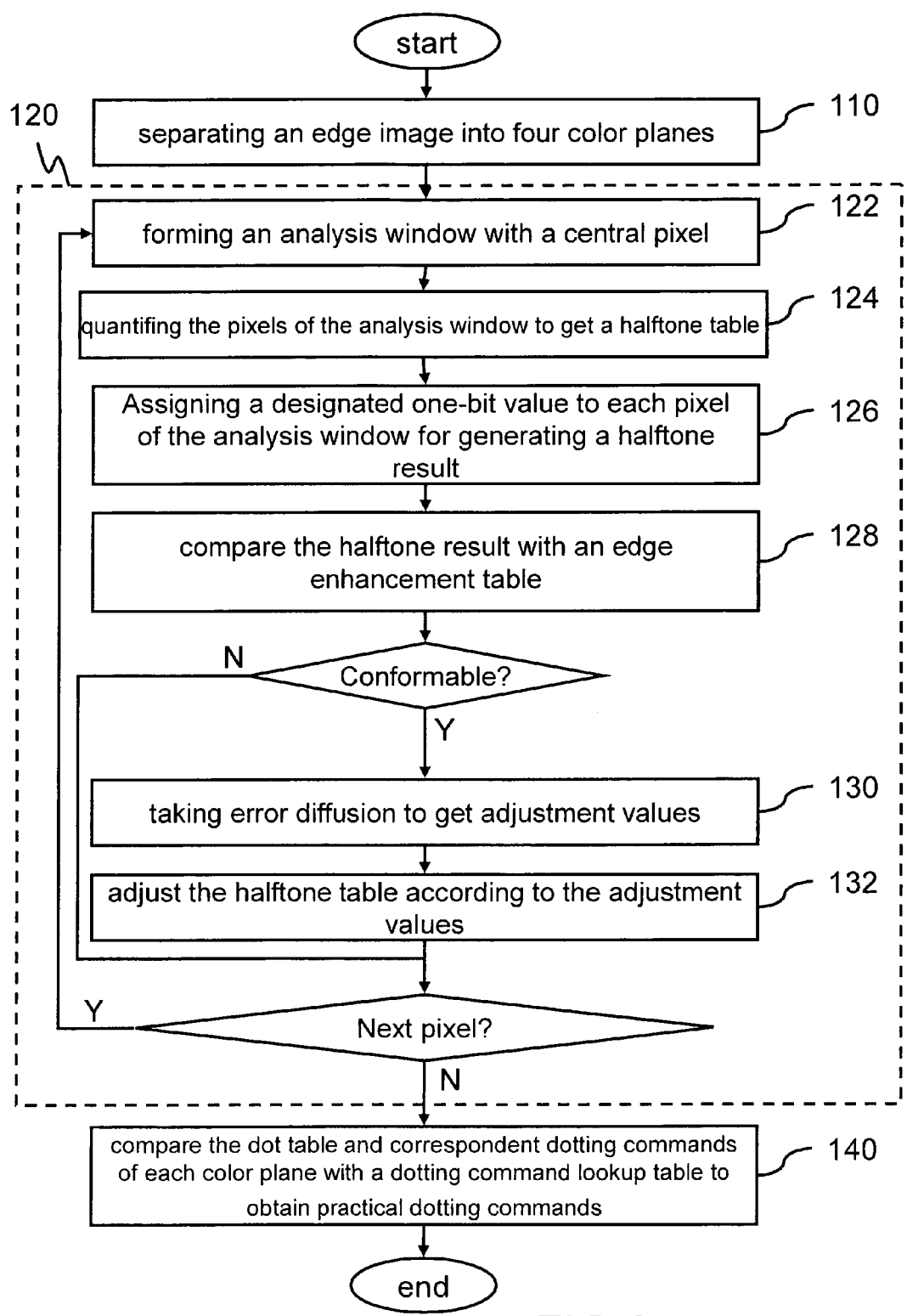
FIG. 2 is flowchart of an edge enhancement method of halftone image in an embodiment of the invention.
Figure 3A:
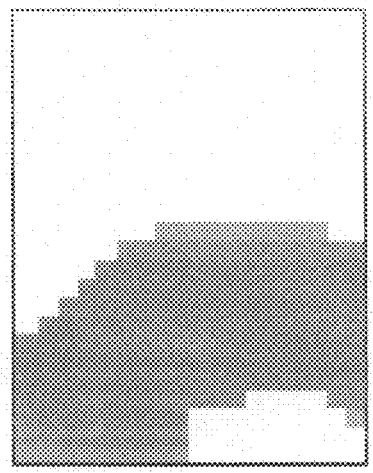
FIGS. 3A to 3D are corresponding images of partial edge portion in FIG. 1B in four color planes.
Figure 3B:
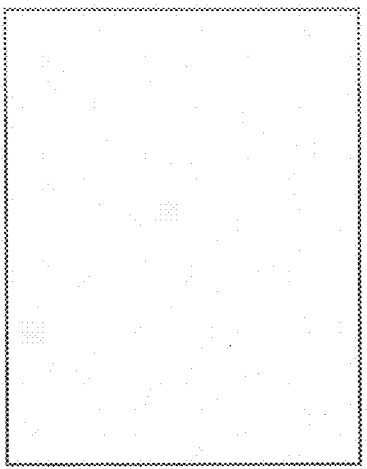
Figure 3C:
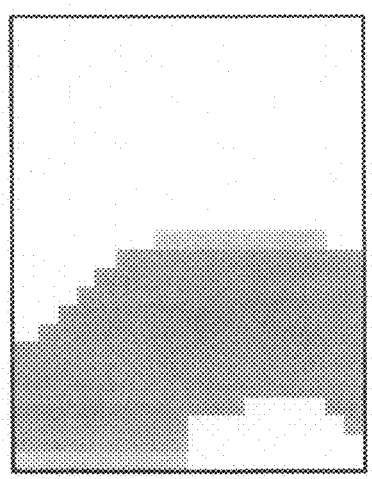
Figure 3D:
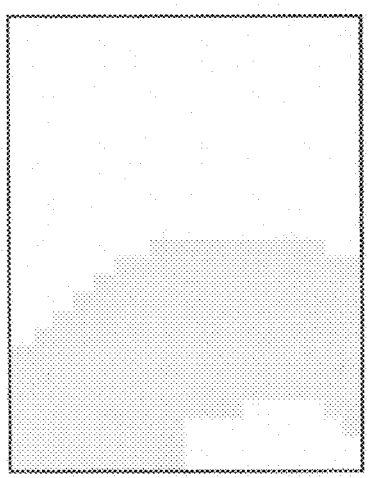

FIG. 1B an enlargement of partial edge portion "A" taken from the image of FIG. 1A. FIG. 2 is flowchart of an edge enhancement method of halftone image in an embodiment of the invention. First, separating the image of edge portion "A" into four color planes (step 110): cyan, magenta, yellow and black (CMYK), as shown in FIGS. 3A to 3D respectively.

Then, process halftone error diffusion for each color plane (step 120). Because the halftone error diffusion process for each color plane is substantially the same, the following description takes the yellow (Y) plane process for example.

Figure 4:
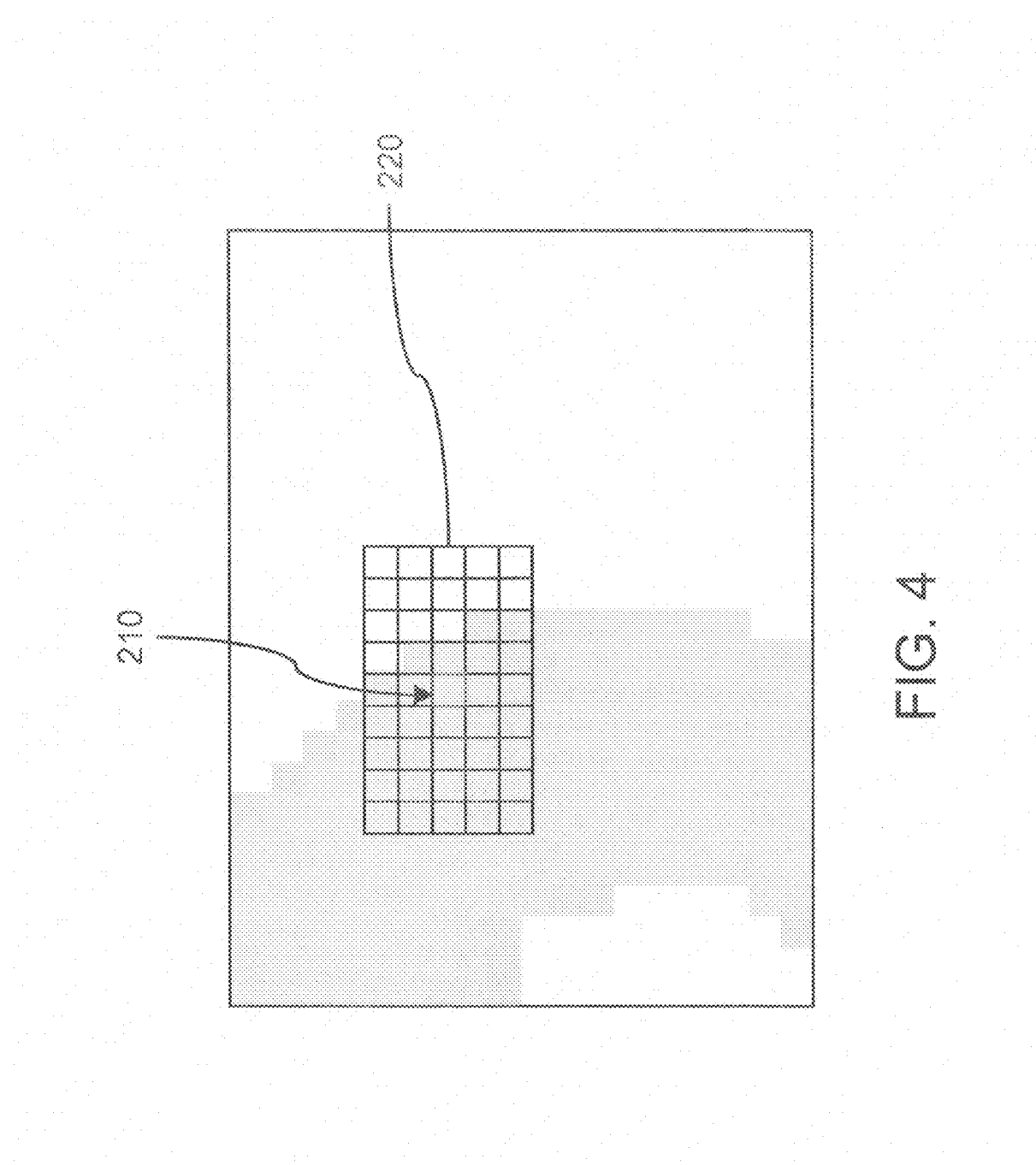
FIG. 4 is a descriptive view of an analysis window in the embodiment of the invention.

As shown in FIG. 4, first form an analysis window 220 with a central pixel 210 (step 122). The analysis window 220 is an m by n matrix including the central pixel 210 and the neighboring pixels located around it. Quantify the pixels of the analysis window 220 to get a halftone table (step 124) in which each pixel has a grayscale value. Assign a designated one-bit value to each pixel of the analysis window 220 for generating a halftone result (step 126). Here, the designated one-bit value for the central pixel is "1" and those for the rest pixels are "0". Further, compare the halftone result with an edge enhancement table to find out a dot table and corresponding dotting commands that are most conformed to the halftone result (step 128). In other words, the edge enhancement table includes a plurality of dotting commands and a plurality of dot tables. In addition, a same dotting command corresponds to a group of dot tables. If there is no dot table conformable in the edge enhancement table, the halftone result is then taken as the base for dotting of the central pixel 210. On the other hand, if there is a dot table conformable in the edge enhancement table, the correspondent dotting commands are obtained for taking error diffusion to get adjustment values (step 130). Then, adjust the halftone table according to the adjustment values (step 132) so as to add the adjustment values into the grayscale values. The foresaid process is repeated for each pixel of each color plane till finishing halftone error diffusion process of all color planes. Finally, compare the dot table and correspondent dotting commands of each color plane with a dotting command lookup table to obtain practical dotting commands for the edge pixels (step 140).

The following description takes pixels a, b, c and d (see FIG. 5) of Y color plane for example of detailed halftone error diffusion process. The resolution of the image is 255 dpi.

FIGS. 6A to 6H are descriptive views of edge enhancement table in the embodiment of the invention. Black dots and white dots are represented as "1" and "0" respectively. The rest (undesignated) portions are negligible. Supposed each dot table 232 is a 9 by 5 matrix, here are six groups of dot tables 232 corresponding to different dotting commands 234 for the edge enhancement table 230. The dotting commands 234 are based on the dot conditions of the central pixel 210 and its neighboring pixels to determine the dot position of the central pixel 210, which is corresponding to the edge portion "A" in FIG. 1.

The dot tables 232 of each group correspond to a same dotting command 234. In the edge enhancement table 230, each group is shown with 4 or 8 dot tables 232 for example. Of course there can be more or less dot tables for determining the dot position of the central pixel 210. In other words, suitable amounts of dotting commands and correspondent dot tables can be settled through software process depending on requirements.

Figure 5:
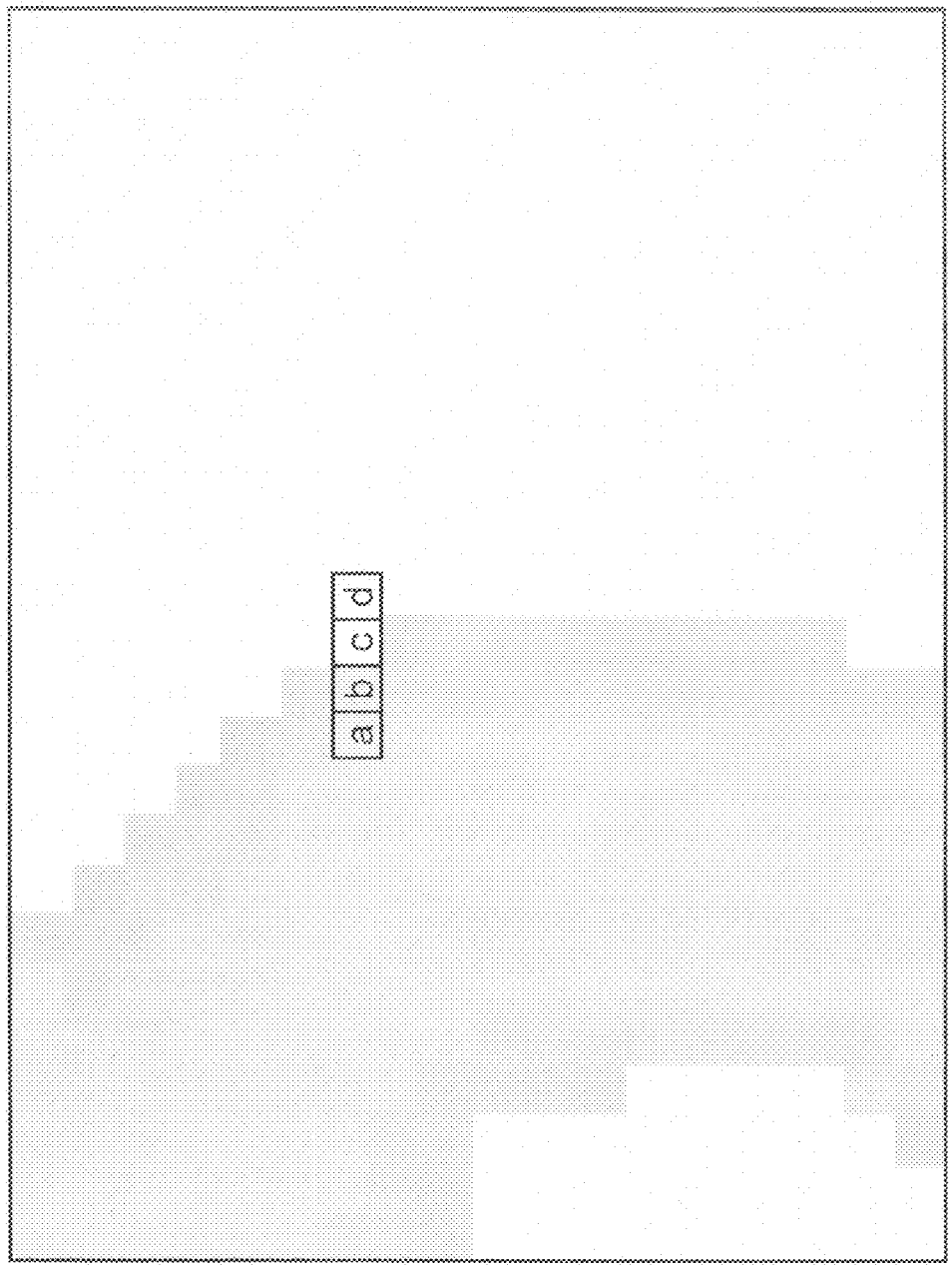
FIG. 5 is a descriptive view of pixel analysis for the partial edge portion in FIG. 1B.
Figure 6A:
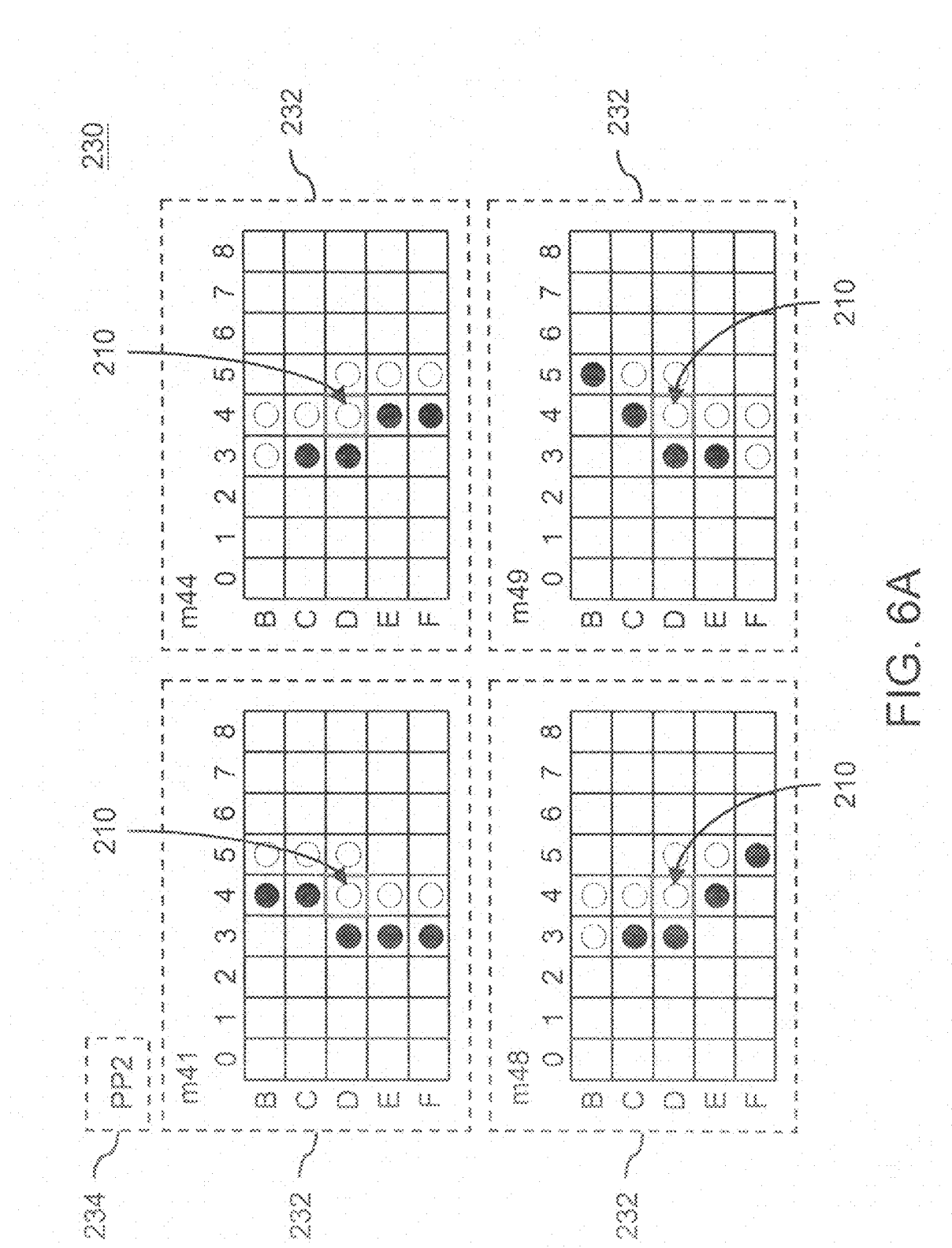
FIGS. 6A to 6H are descriptive views of edge enhancement table in an embodiment of the invention.
Figure 6B:
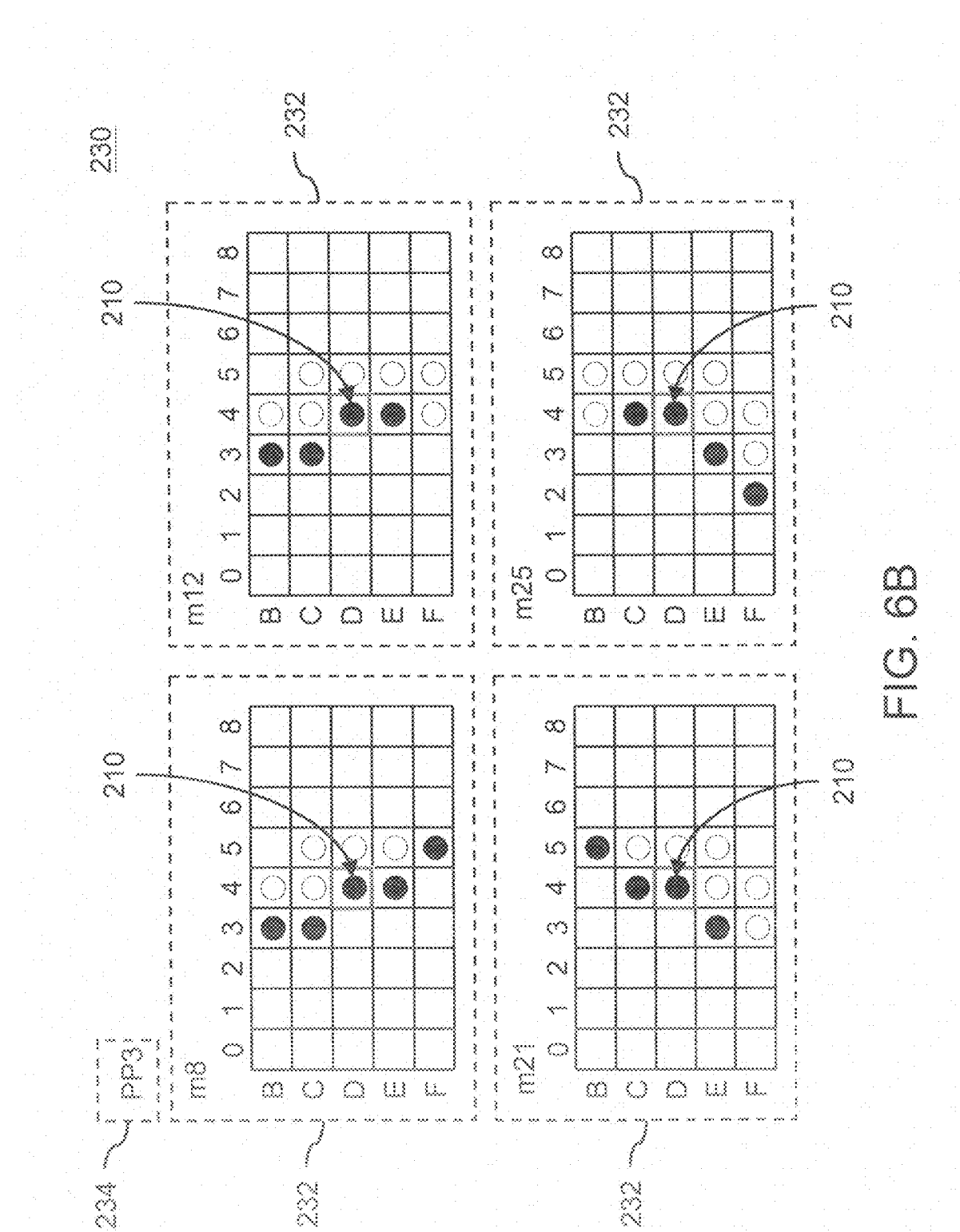
Figure 6C:
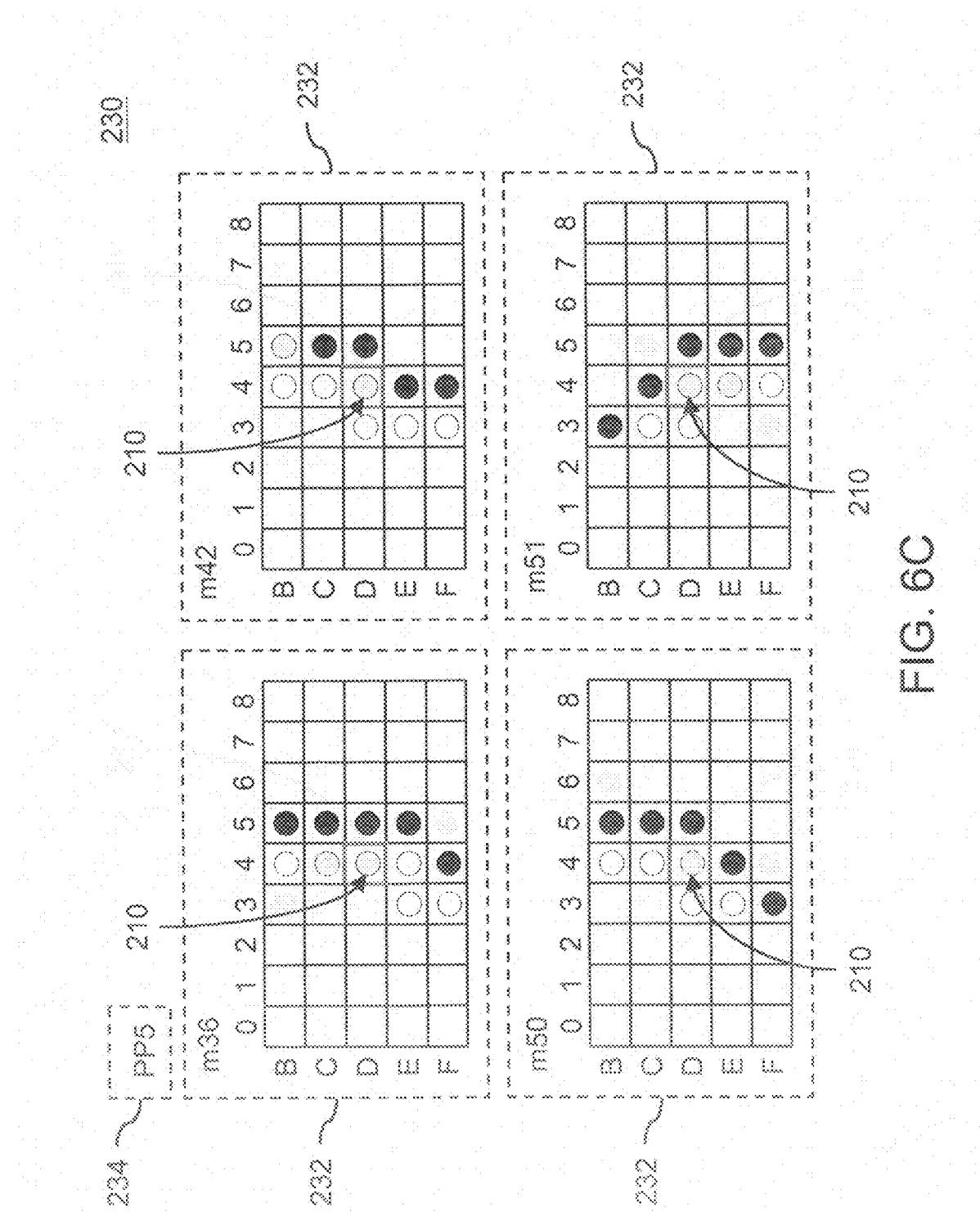
Figure 6D:
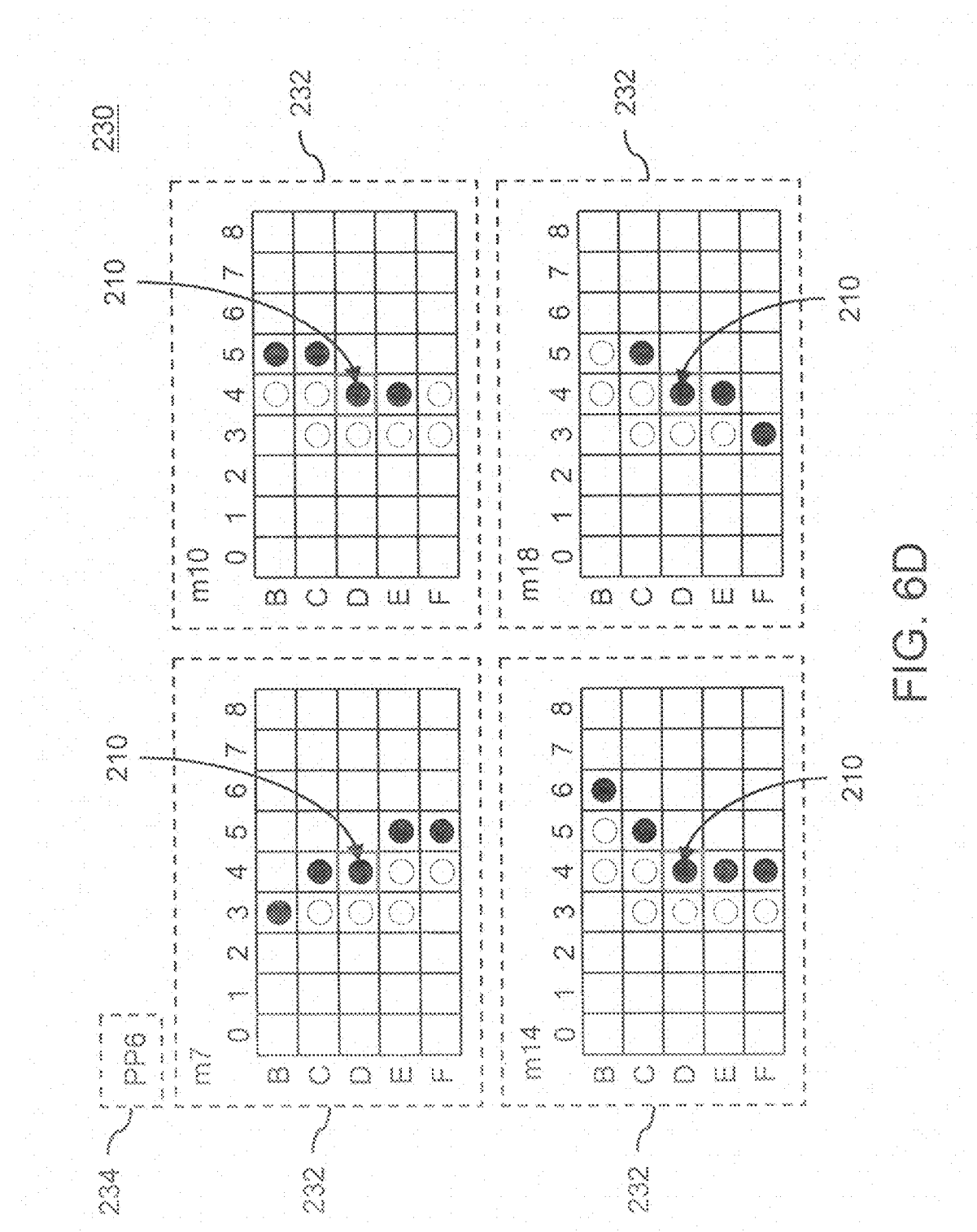
Figure 6E:
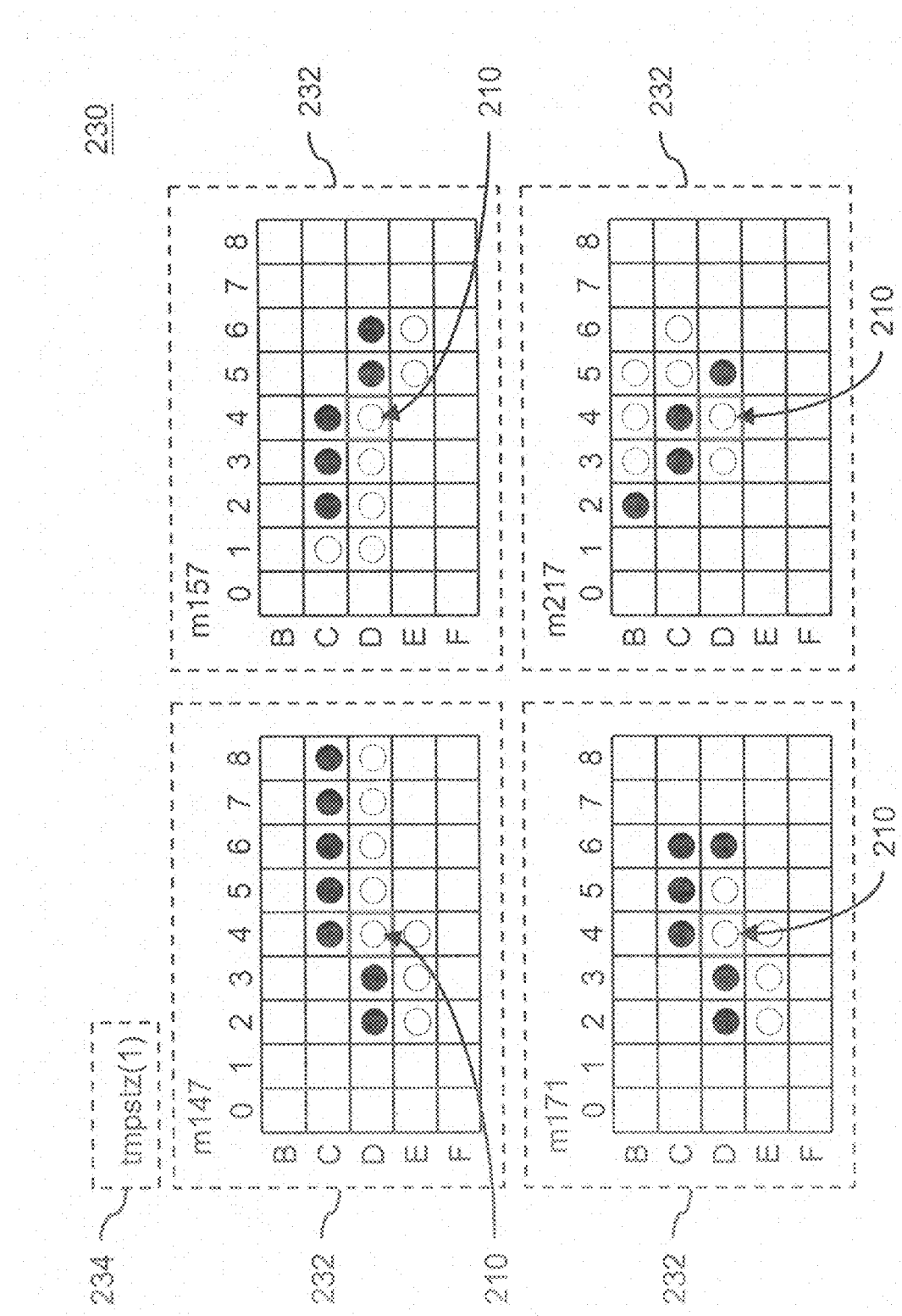
Figure 6F:
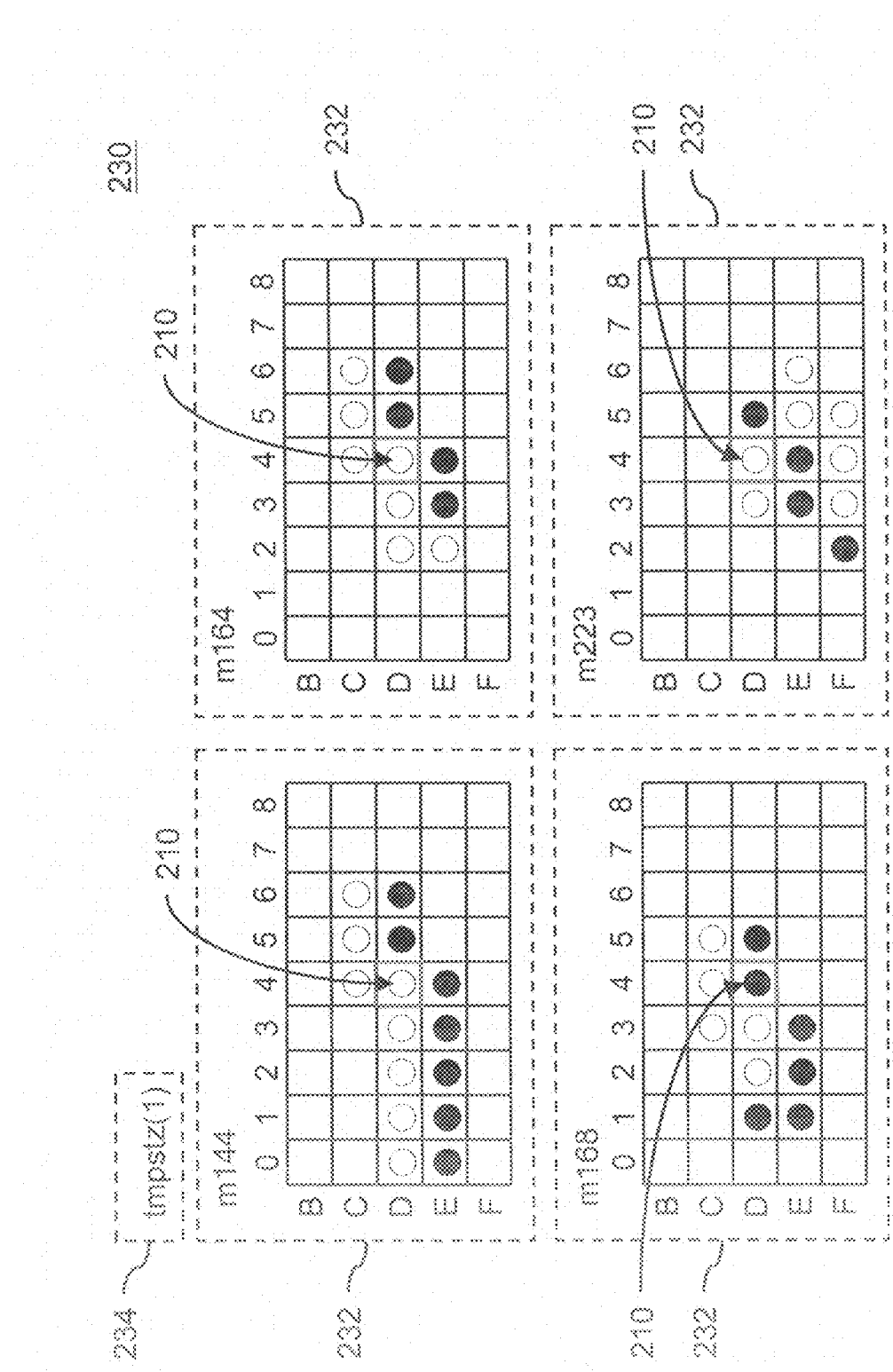
Figure 6G:
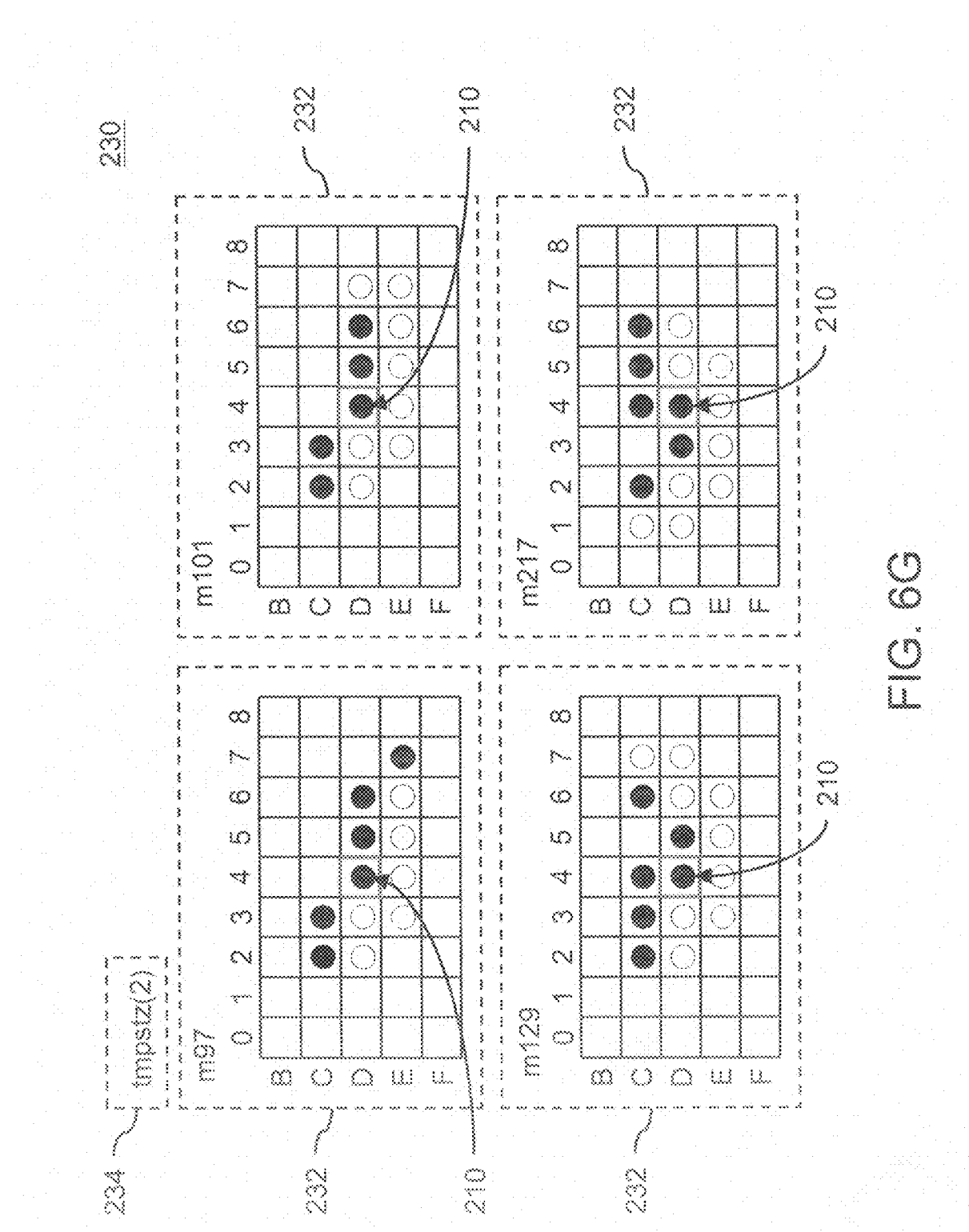
Figure 6H:
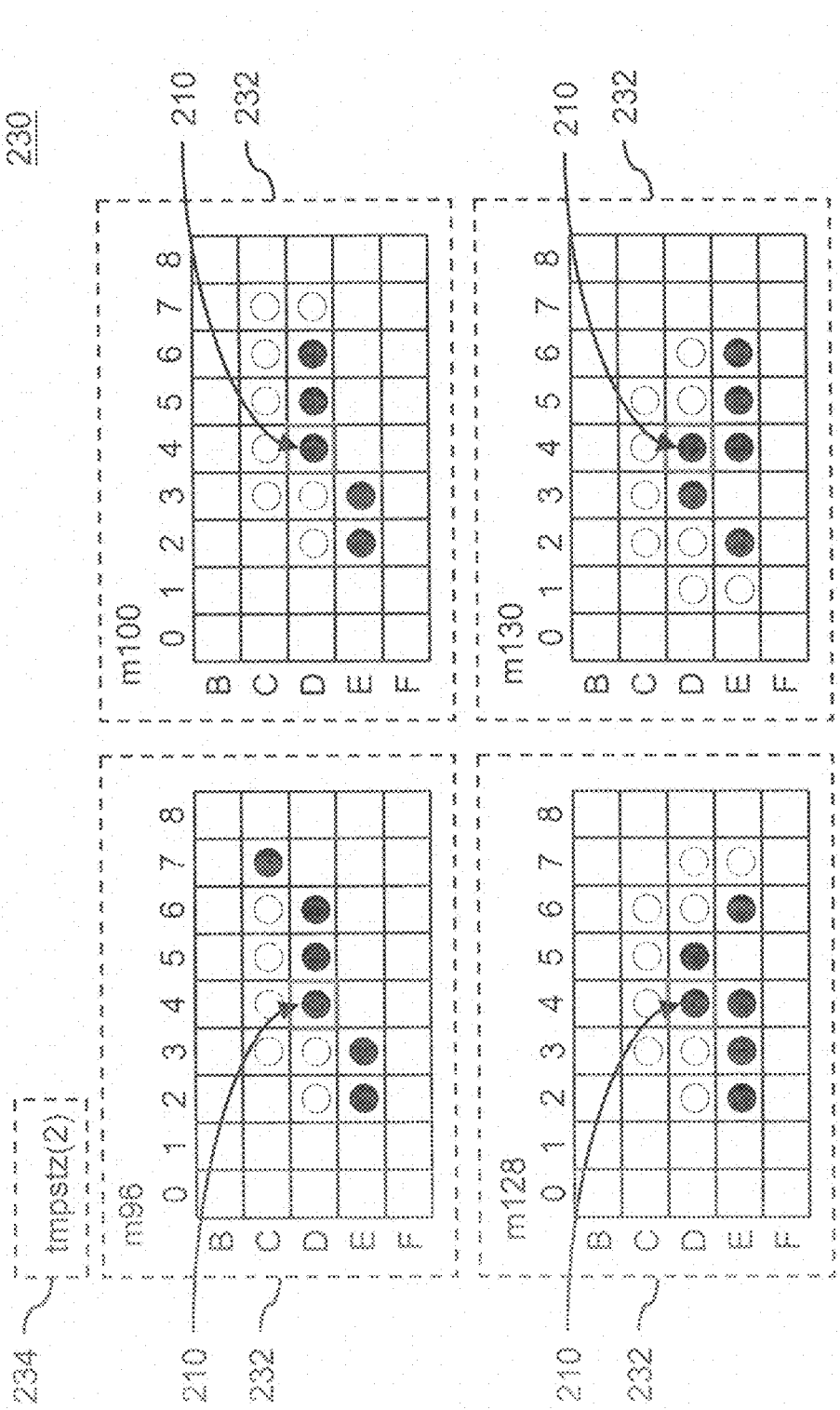
Figure 7:
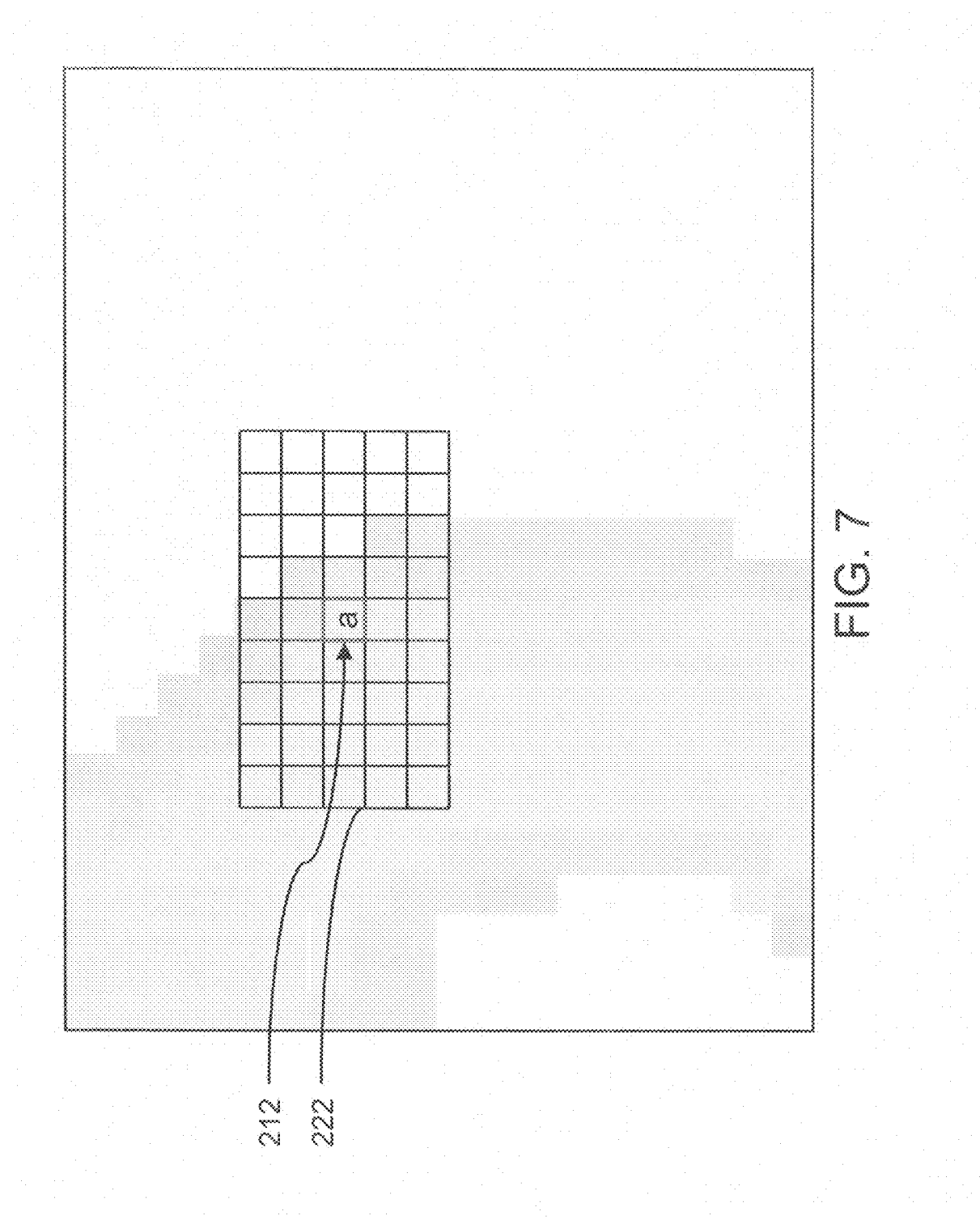
FIG. 7 is a descriptive view of an analysis window for a pixel "a" in the partial edge portion of FIG. 5.

First, a pixel "a" in FIG. 5 is taken as a central pixel 212 for forming an analysis window 222. As shown in FIG. 7, the analysis window is a 9 by 5 matrix including the central pixel 212 and its neighboring pixels. Then, quantify the pixels in the analysis window 222 to get a halftone table 242, as shown in FIG. 8A. The grayscale values of each pixel in the analysis window 222 are h11 to h95, in which $0 \leq h11$ to $h95 \leq 255$.

Assigning a designated one-bit value to each pixel in the analysis window 222 for generating a halftone result 252, as shown in FIG. 8B. The designated one-bit values for the edge pixels are "1", and the rest are "0".

Compare the halftone result 252 with an edge enhancement table 230 to find out a dot table 232 and corresponding dotting commands 234 that are most conformed with the halftone result. If there is no dot table conformable in the edge enhancement table 230, the halftone result 252 is then taken as the base for dotting of the pixel "a".

Figure 9:
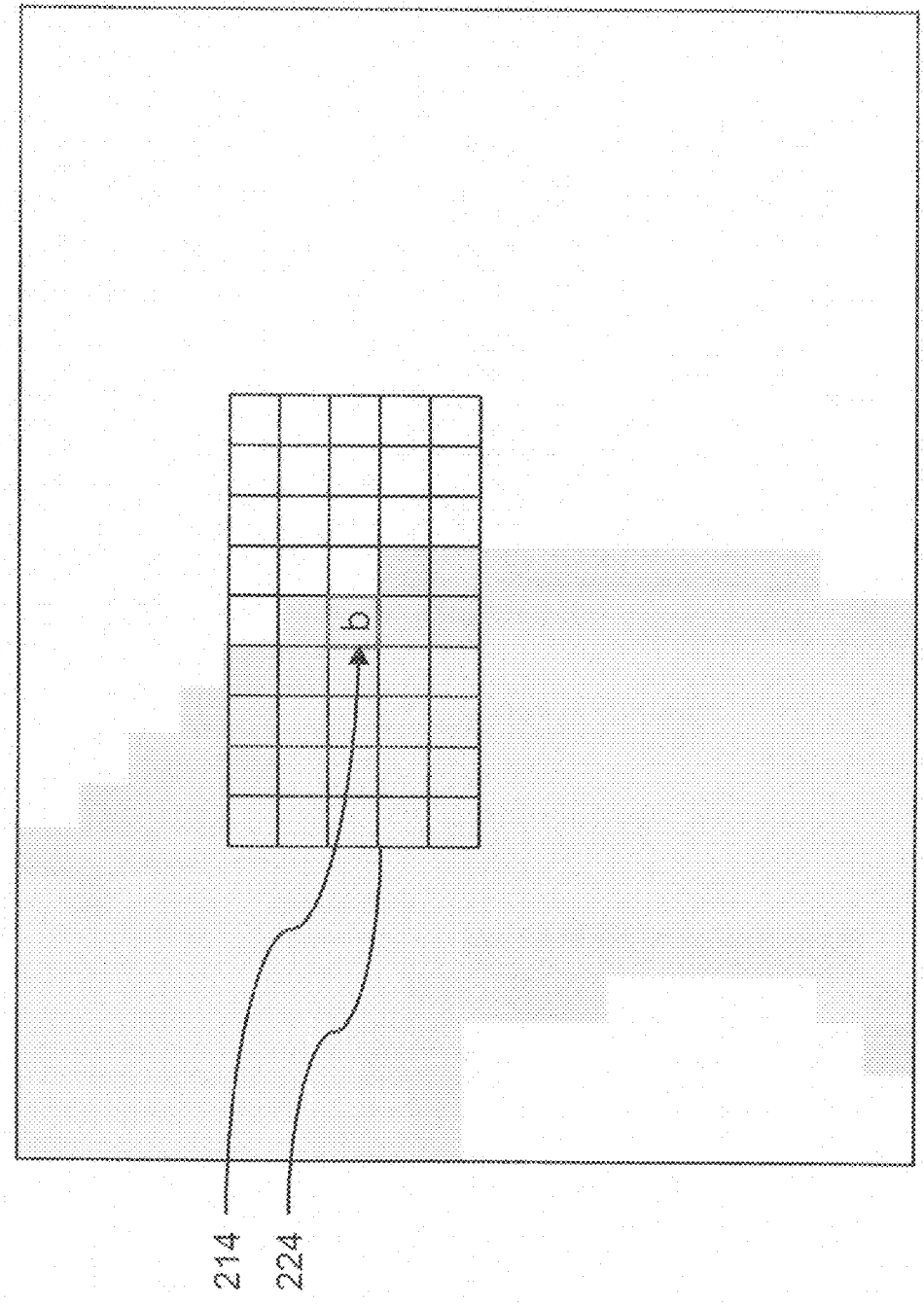
FIG. 9 is a descriptive view of an analysis window of a pixel "b" in FIG. 5.

Then, a pixel "b" in FIG. 5 is taken as a central pixel 214 for forming an analysis window 224. As shown in FIG. 9, the analysis window is a 9 by 5 matrix including the central pixel 214 and its neighboring pixels. Then, quantify the pixels in the analysis window 224 to get a halftone table 244, as shown in FIG. 10A. The grayscale values of each pixel in the analysis window 224 are h11 to h95, in which $0 \leq h11$ to $h95 \leq 255$.

Assign a designated one-bit value to each pixel in the analysis window 224 for generating a halftone result 254, as shown in FIG. 10B. The designated one-bit values for the edge pixels are "1", and the rest are "0".

Compare the halftone result 254 with an edge enhancement table 230 to find out a dot table 232 and corresponding dotting commands 234 that are most conformed to the halftone result. If there is no dot table conformable in the edge enhancement table 230, the halftone result 254 is then taken as the base for dotting of the pixel "b".

Figure 11:
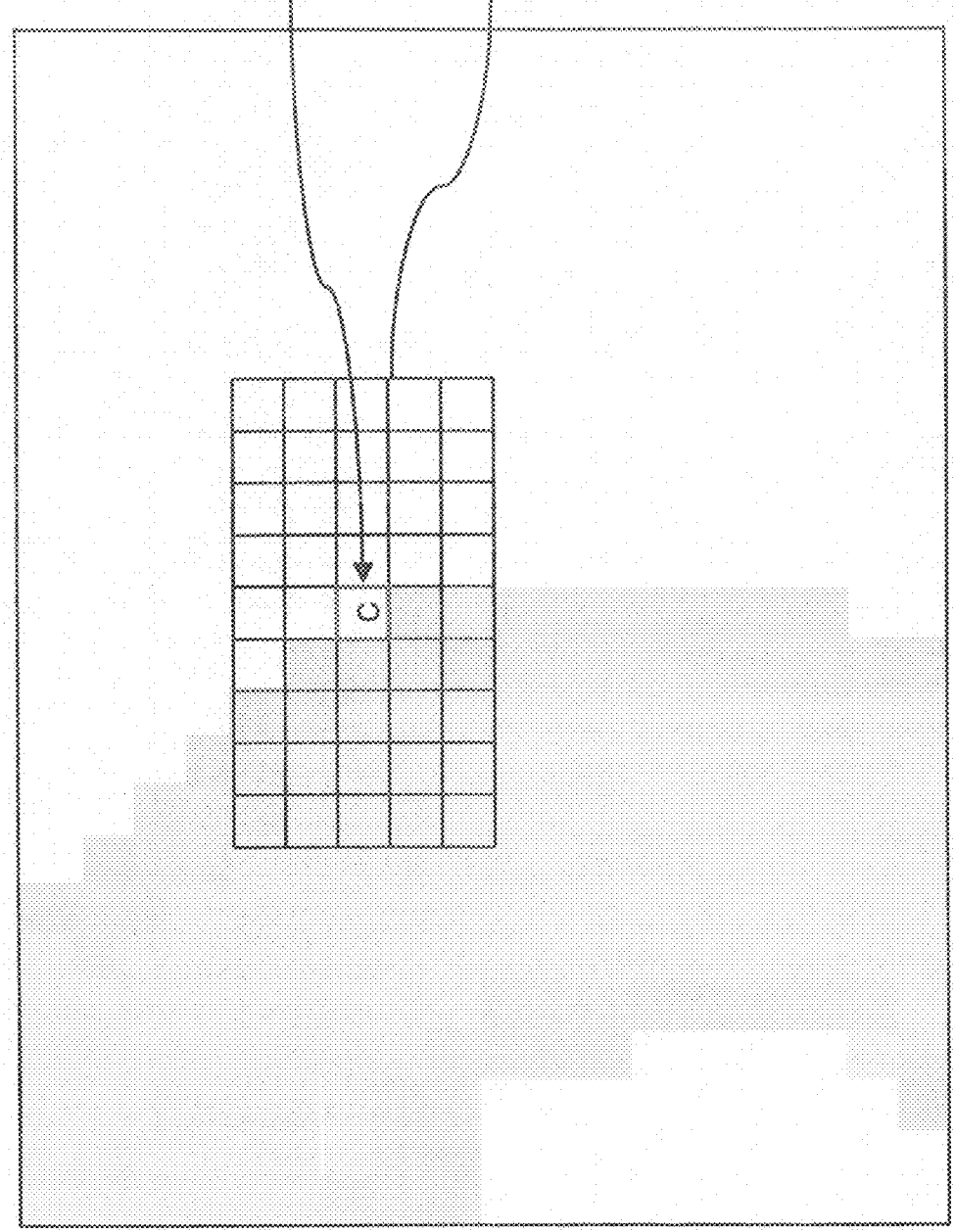
FIG. 11 is a descriptive view of an analysis window of a pixel "c" in FIG. 5.

Further, a pixel "c" in FIG. 5 is taken as a central pixel 216 for forming an analysis window 226. As shown in FIG. 11, the analysis window is a 9 by 5 matrix including the central pixel 216 and its neighboring pixels. Then, quantify the pixels in the analysis window 226 to get a halftone table 246, as shown in FIG. 12A. The grayscale values of each pixel in the analysis window 226 are h11 to h95, in which $0 \leq h11$ to $h95 \leq 255$.

Assign a designated one-bit value to each pixel in the analysis window 226 for generating a halftone result 256, as shown in FIG. 12B. The designated one-bit values for the edge pixels are "1", and the rest are "0".

Compare the halftone result 256 with an edge enhancement table 230 to find out a dot table 232 and corresponding dotting commands 234 that are most conformed to the halftone result. In this step, a dot table 232 and dotting command 234, numbered m44, in PP2 of the edge enhancement table 230 is conformed to the dot conditions of the central pixel 216 and its neighboring pixels in the halftone result 256. The correspondent dotting command 234 of the dot table 232 of m44 is to dot at one third of left side of the central pixel 216 so as to smoothen the edge.

Then, calculate the adjustment values a63 to a95 located after the central pixel 216 according to the dotting command 234 in PP2. As shown in FIG. 13A, those marked with "x" are negligible. In this step, applying error diffusion filter to quantify the pixels located after the central pixel 216 and to get error diffusion values e63 to e95, as shown in FIG. 13B. Then, calculate the adjustment values a65 to a95 of the pixels located after the central pixel 216 according to the error diffusion values e63 to e95 and the dotting command 234. For example:

$$\sum e = e63 + e73 + e83 + e93 + e14 + e24 + \ldots + e75 + e85 + e95;$$

$$PP2 = d\left(\frac{1}{3}\right) = 255 \times \frac{1}{3} = 85;$$

$$a63 = \frac{e63}{\sum e} \times (255 - 85);$$

$$a73 = \frac{e73}{\sum e} \times (255 - 85);$$

$$a83 = \frac{e83}{\sum e} \times (255 - 85);$$

$$\vdots$$

$$a85 = \frac{e85}{\sum e} \times (255 - 85);$$

$$a95 = \frac{e95}{\sum e} \times (255 - 85)$$

Further, add the adjustment values a63 to a95 to the original grayscale value h63 to h95 respectively to get an after-adjustment halftone table 246', as shown in FIG. 13C.

For example, supposed error diffusion values, as shown in FIG. 14A, are obtained after quantifying the pixels located after the central pixel 216. Then, according to the above equations, we get $\Sigma e = 46$, and calculations of adjustment values as shown in FIG. 14B. after adding the adjustment values to the original grayscale values h63 to h95, an after-adjustment halftone table 246' is obtained.

Figure 15:
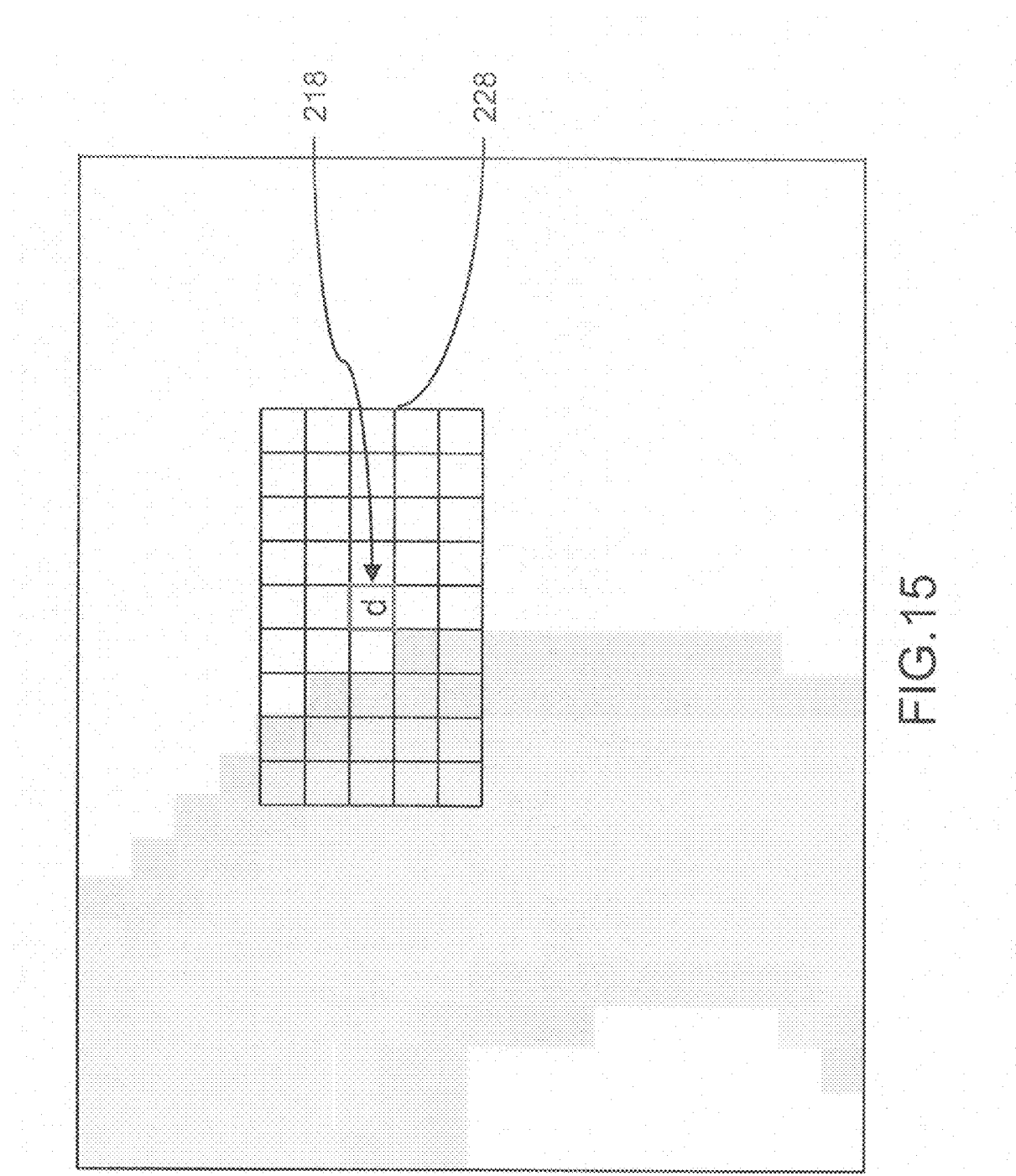
FIG. 15 is a descriptive view of an analysis window of a pixel "d" in FIG. 5.

Further, a pixel "d" in FIG. 5 is taken as a central pixel 218 for forming an analysis window 228. As shown in FIG. 15, the analysis window is a 9 by 5 matrix including the central pixel 218 and its neighboring pixels. Then, quantify the pixels in the analysis window 228 to get a halftone table 248, as shown in FIG. 16A. The grayscale values of each pixel in the analysis window 228 are h11 to h95, in which $0 \leq h11$ to $h95 \leq 255$.

Assign a designated one-bit value to each pixel in the analysis window 228 for generating a halftone result 258, as shown in FIG. 16B. The designated one-bit values for the edge pixels are "1", and the rest are "0".

Compare the halftone result 258 with an edge enhancement table 230 to find out a dot table 232 and corresponding dotting commands 234 that are most conformed to the halftone result. If there is no dot table conformable in the edge enhancement table 230, the halftone result 258 is then taken as the base for dotting of the pixel "d". Here, the grayscale value h62 in the halftone table 248 is the grayscale value h63+a63 in the aforesaid after-adjustment halftone table 246'.

By the aforesaid process, dot tables and dotting commands corresponding to each halftone result of each color plane are obtained. Finally, compare the dot table and correspondent dotting commands of each color plane with a dotting command lookup table to obtain practical dotting commands for the edge pixels.

Table 1 is an example of dotting command lookup table. In the table, "None" means no conformable dotting command for any color plane. "One plane" means there is a conformable dotting command for a color plane. Conformable plane "C" means there is a conformable dotting command for the cyan plane. Conformable plane "M" means there is a conformable dotting command for the magenta plane. Conformable plane "Y" means there is a conformable dotting command for the yellow plane. Conformable plane "K" means there is a conformable dotting command for the black plane. The table also shows the practical dotting process when there are two or more color planes having conformable dotting commands.

TABLE 1

Dotting command lookup table

| | Comparison result | | | Practical dotting command |
|---|---|---|---|---|
| Conformable plane | None | | | Remain original result |
| Conformable plane | One plane | | | The dotting command of conformable plane |
| Conformable plane | C | M | | |
| Dotting command | Left ⅓ | Right ⅓ | | C: left ⅓ and M: right ⅓ |
| | Left ⅓ | Left ⅓ | | C: left ⅓ or M: left ⅓ |
| | . | . | | . |
| | . | . | | . |
| | . | . | | . |
| Conformable plane | C | Y | | |
| Dotting command | Left ⅓ | Right ⅓ | | C: left ⅓ and Y: right ⅓ |
| | left ⅓ | Left ⅓ | | C: left ⅓ or Y: left ⅓ |
| | . | . | | . |
| | . | . | | . |
| | . | . | | . |
| Conformable plane | C | K | | |
| Dotting command | Left ⅓ | Right ⅓ | | C: left ⅓ and K: right ⅓ |
| | Left ⅓ | Left ⅓ | | K: left ⅓ |
| | . | . | | . |
| | . | . | | . |
| | . | . | | . |
| Conformable plane | M | Y | | |
| Dotting command | Left ⅓ | Right ⅓ | | M: left ⅓ and Y: right ⅓ |
| | Left ⅓ | Left ⅓ | | M: left ⅓ or Y: left ⅓ |
| | . | . | | . |
| | . | . | | . |
| | . | . | | . |
| Conformable plane | M | K | | |
| Dotting command | Left ⅓ | Right ⅓ | | M: left ⅓ and K: right ⅓ |
| | Left ⅓ | Left ⅓ | | K: left ⅓ |
| | . | . | | . |
| | . | . | | . |
| | . | . | | . |
| Conformable plane | C | M | Y | |
| Dotting command | Left ⅓ | Left ⅓ | Left ⅓ | C: left ⅓ or M: left ⅓ or Y: left ⅓ |
| | Left ⅓ | Left ⅓ | Right ⅓ | C: left ⅓ or M: left ⅓ and Y: right ⅓ |
| | . | . | . | . |
| | . | . | . | . |
| | . | . | . | . |
| Conformable plane | C | M | K | |
| Dotting command | Left ⅓ | Left ⅓ | Left ⅓ | K: left ⅓ |
| | Left ⅓ | Left ⅓ | Right ⅓ | C: left ⅓ or M: left ⅓ and K: right ⅓ |
| | . | . | . | . |
| | . | . | . | . |
| | . | . | . | . |
| Conformable plane | C | K | Y | |

TABLE 1-continued

Dotting command lookup table

| | Comparison result | | | | Practical dotting command |
|---|---|---|---|---|---|
| Dotting command | Left ⅓ | Left ⅓ | Left ⅓ | | K: left ⅓ |
| | Left ⅓ | Left ⅓ | Right ⅓ | | K: left ⅓ and Y: right ⅓ |
| | . | . | . | | . |
| | . | . | . | | . |
| | . | . | . | | . |
| Conformable plane | M | K | Y | | |
| Dotting command | Left ⅓ | Left ⅓ | Left ⅓ | | K: left ⅓ |
| | Left ⅓ | Left ⅓ | Right ⅓ | | K: left ⅓ and Y: right ⅓ |
| | . | . | . | | . |
| | . | . | . | | . |
| | . | . | . | | . |
| Conformable plane | C | M | Y | K | |
| Dotting command | Left ⅓ | Left ⅓ | Left ⅓ | Left ⅓ | K: left ⅓ |
| | Left ⅓ | Left ⅓ | Left ⅓ | Right ⅓ | K: right ⅓ and C: left ⅓ or M: left ⅓ or Y: left ⅓ |
| | Left ⅓ | Left ⅓ | Right ⅓ | Left ⅓ | K: left ⅓ and Y: right ⅓ |
| | Left ⅓ | Left ⅓ | Right ⅓ | Right ⅓ | K: right ⅓ and C: left ⅓ or M: left ⅓ |
| | Left ⅓ | Right ⅓ | Left ⅓ | Left ⅓ | K: left ⅓ and M: right ⅓ |
| | . | . | . | . | . |
| | . | . | . | . | . |
| | . | . | . | . | . |

For example, when the cyan plane has a dotting command of "Left ⅓", and the Magenta plane has a dotting command of "Right ⅓", then, the practical dotting commands are: dotting at the one third left side of the edge pixel with a cyan dot, and dotting at the one third right side with a magenta dot.

Taking the edge portion A in FIG. 1B as an example, the pixel "c" has halftone patterns numbered m44 conformable in both cyan and magenta color planes. Their correspondent dotting commands are all dotting at one third left side of the central pixel. There is no other conformable dot table in the other planes. Therefore, from Table 1, looking up the "Left ⅓" in C plane and "Left ⅓" in M plane to get the practical dotting commands of dotting 10 at one third left side of the edge pixel with a cyan or magenta plane.

The aforesaid embodiment is described with color image. However, it is applicable to monochromatic image. When enhancing the edge of a monochromatic image, the aforesaid step 110 is omitted and directly proceeding the halftone error diffusion.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for enhancing edge of a halftone image, comprising steps of:
   performing the following steps using an image processing device;
   forming an analysis window with a pixel as a central pixel; the analysis window comprising the central pixel and neighboring pixels;
   quantifying the pixels to get a halftone table;
   assigning a designated value to each pixel for generating a halftone result;
   comparing the halftone result with an edge enhancement table having a plurality of dotting commands and a plurality of dot tables; the dot tables correspond to one of the dotting commands; and
   executing a halftone table adjustment when one of the dot tables is conformed to the halftone result; the adjustment comprising steps of:
      obtaining correspondent dotting commands according to the conformed dot table;
      calculating a plurality of adjustment values for the pixels according to the dotting commands and an error diffusion process; and
      adjusting the halftone table according to the adjustment values.

2. The method for enhancing edge of a halftone image according to claim 1 wherein the halftone table comprises a plurality of grayscale values of the pixels.

3. The method for enhancing edge of a halftone image according to claim 1 wherein the step of adjusting the halftone table according to the adjustment values further comprises a step of adding the grayscale values with the adjustment values of same pixels.

4. The method for enhancing edge of a halftone image according to claim 1 wherein the dotting command is to define a representative dot position for the pixels.

5. The method for enhancing edge of a halftone image according to claim 1 wherein the dot table has a same size as that of the analysis window.

6. The method for enhancing edge of a halftone image according to claim 1 wherein the designated value is a one-bit value.

7. A method for enhancing edge of a colored halftone image, comprising steps of:
   performing the following steps using an image processing device;
   separating an edge image into four color planes;
   performing a halftone diffusion process to the each color plane; the process comprises steps of:

forming an analysis window with a pixel as a central pixel; the analysis window comprises the central pixel and neighboring pixels;

quantifying the pixels to get a halftone table;

assigning a designated value to each pixel for generating a halftone result;

comparing the halftone result with an edge enhancement table having a plurality of dotting commands and a plurality of dot tables; the dot tables correspond to one of the dotting commands; and executing a halftone table adjustment when one of the dot tables is conformed to the halftone result; the adjustment comprises steps of:

obtaining correspondent dotting commands according to the conformed dot table;

calculating a plurality of adjustment values for the pixels according to the dotting commands and an error diffusion process; and adjusting the halftone table according to the adjustment values; and comparing the dot table and correspondent dotting commands of each color plane with a dotting command lookup table to obtain practical dotting commands for the pixels.

8. The method for enhancing edge of a halftone image according to claim 7 wherein the halftone table comprises a plurality of grayscale values of the pixels.

9. The method for enhancing edge of a halftone image according to claim 7 wherein the step of adjusting the halftone table according to the adjustment values further comprises a step of adding the grayscale values with the adjustment values of same pixels.

10. The method for enhancing edge of a halftone image according to claim 7 wherein the dotting command is to define a representative dot position for the pixels.

11. The method for enhancing edge of a halftone image according to claim 7 wherein the dot table has a same size as that of the analysis window.

12. The method for enhancing edge of a halftone image according to claim 7 wherein the dotting command lookup table comprises the contents of conformable dotting command from no conformation to all conformations of color planes, combinations of dotting commands, and a plurality of practical dotting commands corresponding to the contents.

13. The method for enhancing edge of a halftone image according to claim 7 wherein the designated value is a one-bit value.

* * * * *